United States Patent [19]

Zimmerman et al.

[11] Patent Number: 5,601,676
[45] Date of Patent: Feb. 11, 1997

[54] COMPOSITE JOINING AND REPAIR

[75] Inventors: Kristin B. Zimmerman, St. Clair Shores; Dahsin Liu, Okemos, both of Mich.

[73] Assignee: The Board of Trustees Operating Michigan State University, East Lansing, Mich.

[21] Appl. No.: 201,771

[22] Filed: Feb. 25, 1994

[51] Int. Cl.$^6$ ............................................. B32B 31/00
[52] U.S. Cl. .................. 156/98; 156/304.3; 156/304.5; 428/61; 29/402.08; 29/402.11
[58] Field of Search .................. 156/304.3, 304.5, 156/94, 98; 428/60, 61, 174; 144/330, 332; 29/402.08, 402.09, 402.11

[56] References Cited

U.S. PATENT DOCUMENTS

| | | | |
|---|---|---|---|
| 766,930 | 8/1904 | Clemons | 156/304.3 |
| 2,027,747 | 10/1934 | Morton | 156/304.3 |
| 2,391,731 | 12/1945 | Miller et al. | 156/304.3 |
| 3,669,813 | 6/1972 | Andner . | |
| 3,814,645 | 6/1974 | Fletcher . | |
| 3,885,071 | 5/1975 | Blad et al. | 156/304.5 |
| 4,409,270 | 10/1983 | Faber et al. . | |
| 4,430,133 | 2/1984 | Griffith . | |
| 4,511,621 | 4/1985 | Thomas et al. . | |
| 4,517,038 | 5/1985 | Miller . | |
| 4,556,592 | 12/1985 | Bannink, Jr. . | |
| 4,564,543 | 1/1986 | Ritter . | |
| 4,861,643 | 8/1989 | Scollard . | |
| 5,148,645 | 9/1992 | Lehnert et al. . | |
| 5,160,771 | 11/1992 | Lambing et al. | 428/60 |

OTHER PUBLICATIONS

Reader's Digest Complete Do-it-yourself Manual, p. 98.
Simm & Schuster Complete Guide to Home Repair & Maintenance, p. 126.

*Primary Examiner*—Michael W. Ball
*Assistant Examiner*—Sam Chuan Yao
*Attorney, Agent, or Firm*— Bliss McGlynn, P.C.

[57] ABSTRACT

A method of composite joining and repairing includes providing complementary matching and interlocking bondline surface configurations in composite materials and the material to which the composite materials are to be bonded, interlocking the two materials at their bondline, and thereafter adhering at least one patch onto both of the surfaces of the interlocked combination of materials, thereby securing the composite to the other material. Anisotropic materials can be adhered to isotropic materials by this method. The advantages of the method include increased bond strength resulting from the joining. Consequently, fiberglass vehicle parts can be repaired, to achieve the original strength of the part, or in the alternative, parts can be originally machined in the bondline configurations so as to enable easy manufacture of new vehicle components.

13 Claims, 3 Drawing Sheets

FIG 1
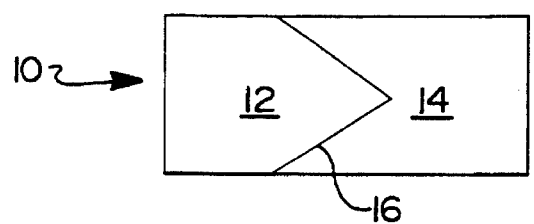
FIG 2
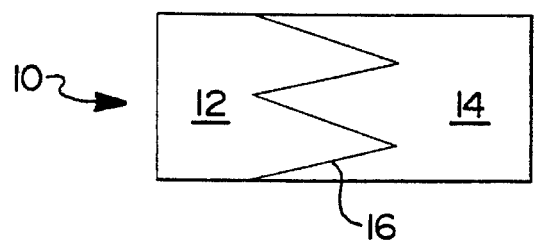
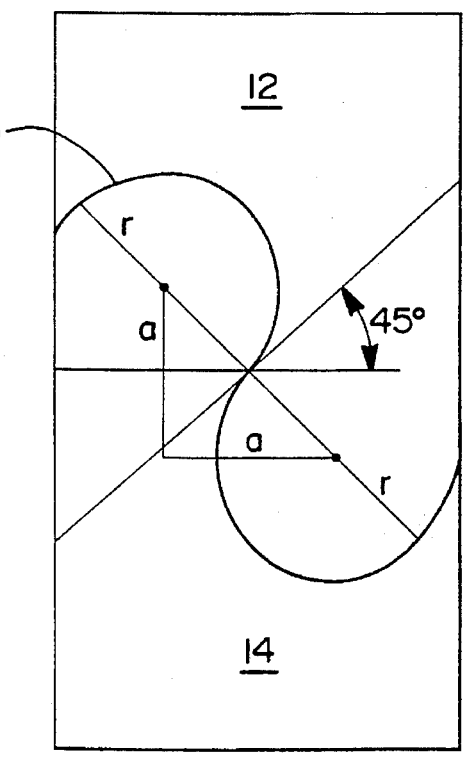
FIG 3

COMPOSITE JOINING AND REPAIR

BACKGROUND OF THE INVENTION

1. Field of the Invention

The present invention relates generally to a method of joining and repairing composite materials and, more particularly, to a method of joining and repairing composites which includes interlocking the two pieces to be joined and/or repaired.

2. Description of the Related Art

As the material sciences advance, more vehicles and consumer parts are being manufactured of composite materials. However, these composite materials have experienced problems in manufacturing and during repair because they are difficult to adhere to one another in addition to being difficult to adhere to other materials. For example, in the automotive context, a fiberglass reinforced thermoset plastic part (FRP), such as a front quarter panel, needs to be adhered to a metal part, such as the vehicle chassis. Joining the FRP to the metal is difficult because they are two unlike materials.

On the other hand, in the event that the vehicle is involved in an accident, the front quarter panel may become punctured or otherwise damaged. In this event, repair or replacement is necessary. Again, to join a composite piece (the repair piece) to the damaged piece requires composite joining. To maintain the original strength and integrity of the damaged part, new methods are required for joining the two composite pieces.

Consequently, among the primary problems encountered with repair and joining of composites to other materials is either restoring the original structure to a condition where the physical properties such as tensile strength, compressive strength, bending strength and the like would approximate that of the original undamaged structure, or in the alternative, that the originally joined manufactured parts could easily be joined together in a manner that would provide a strong joint.

Therefore, it would be advantageous to provide a method for repairing and joining composite materials while providing nearly original strength, or 100% restored strength.

Conventional methods of repairing composite materials include scarfing, or abrading, an area near the damaged portion, filling the void created by the scarfing with a resin, and applying a patch on top of the resin filled void and allowing it to cure. The patch may be plane-woven, or a fiberglass filler chopped up and slurried into the resin to act as a reinforcement in the patch. If the patches are placed on both sides of the damaged area, on top and underneath the damaged zone, this is referred to as a "double lap joint" repair. Prior repair techniques to this describe woven fiberglass cloth swatches being bonded to a fiberglass structure at the points of discontinuity (where the damage occurred) in such a manner that the stresses, which normally would accumulate at the severed ends of the glass filaments in the original structure, were transmitted through the glass cloth of the patch. Although this method overcame the problem encountered where a concentration of stresses at the defect site normally resulted in the complete rupture of the fiberglass, the rupture occurred at an undesirably low stress level. The greatest advantage of the present invention over the prior art methods is that the rupture at the damaged area will occur at a much higher stress level. Another problem is introduced by applying isotropic glass cloth (that is, a cloth having the same physical strength in all directions) to anisotropic materials, i.e. those materials which have unequal physical properties along different axes (such as a woven cloth having its greatest strengths at the 0° and 90° orientations along the warp and fill directions).

Typically, metals are isotropic because they have the same strength in all directions. Composites, made up of plane-woven fiberglass mats, are considered anisotropic because they exhibit their greatest strength in two directions. For instance, most fiberglass plane woven mats that are saturated with resins acting as patches for fiberglass repair have strengths in the 0° and 90° orientations, i.e. or following the warp and fill thread directions in a square weave cloth. A new method of joining would be especially helpful in bonding isotropic to anisotropic materials, such as bonding plane woven mat composites to random fiber composites, metals or other thermoset plastics.

Furthermore, it would be advantageous to provide a method for making pre-assembled manufactured parts having specific bondline configurations which would later on facilitate interlocking of those parts for better joining. For example, if a fiberglass part and a metal part which were to be joined together were originally manufactured with the bondline configurations set forth in the invention hereinafter, a manufactured part could be joined via the method of the present invention to provide a manufactured part having great strength and flexibility.

It would also be advantageous to provide a method for composite joining which would reduce the stress concentration at the bondline, thereby increasing the contribution of the reinforcement patch to joint strength. In basic terms, it would help the strength of the double lap joint patches if there was an additional contribution to the bonding. That additional contribution is the subject of the present invention.

SUMMARY OF THE INVENTION

In accordance with the present invention, a method is provided for repairing and joining composite materials which have either been damaged, or which must be joined in order to manufacture a part. In its simplest form, the method of the present invention provides for making complementary matching and interlocking bondline surface configurations in both of the materials to be joined in combination with applying at least one patch onto the outer surfaces of the materials once they are joined through their bondline. This results in two independent contributing methods of joining at the same bondline, although our method provides for accumulative bond strength between the bondline interlocking and patch reinforcement strength. In other words, the scarfing and filling procedure of the prior art has been replaced with a novel step of providing an interlocking bondline configuration, thereby increasing the strength of the repair over the original strength, and providing a new method which is less labor intensive, less expensive, more aesthetic and is more amenable to new designs which join different materials. The advantages are quite significant in that a strong bond is produced, one that can not only be used to repair something to a better-than-new status, but also a bond that can bond two dissimilar materials together in an original manufacture setting that was impractical until our invention came along.

Since many metal body parts in vehicles are being replaced with composite materials to reduce weight while maintaining strength, it is becoming increasingly important to bond the composites to metal parts of the vehicle. Until now, it has not been very easy to effect a really good bond between a composite quarter panel to the metal main frame of a vehicle. One can lose all the benefits of using the composite materials if the bond between the composite material and the metal frame is inadequate.

Because metal is so much cheaper for forming vehicle body parts, composites generally tend to be used on the more expensive and exotic performance vehicles because the increased cost is justified by the decrease in weight. If a composite panel is damaged in an accident, the current method for fixing it is to replace it. This drives up insurance costs because the customers who own these expensive vehicles do not want a poorly repaired panel. Current methods of repair yield panels with unacceptably low strengths which is why the panels are replaced if they are damaged. As these composite panels are expensive, it is most advantageous to have a method for adequately repairing them. Our invention is capable of restoring a composite panel to 100% of its original strength. This means that damaged composites can be repaired rather than replaced.

Furthermore, it has been very difficult to bond the thin (down to 3 millimeters thick) vehicle panels. Our invention makes this possible. The thinner panels are desirable because they weigh less while being able to take the same loads and forces as metal, while providing some flexibility and memory that metals cannot provide. Due to this, a new method has been needed which provides a better bond than conventional methods, especially for bonding thin vehicle panels together.

In specific embodiments, the pieces of material to be joined shall have cut therein a mated interlocking bondline configuration such as a U, V, W, or S-shaped configuration, such that the two pieces of material will interlock and match as closely as possible. Of course, our invention contemplates many different interlocking configurations, and is not limited to the U, V, W or S configuration. After the bondlines have been interlocked, resin saturated patches may be placed on top of the interlocked joint, as well as underneath the interlocked joint and then cured together for increased strength.

For example, it would be like taking two pieces of a jigsaw puzzle and interlocking them, followed by placing reinforcement material on top of, and underneath, the jigsaw puzzle pieces, while gluing all of the pieces together along with the patches. As one can see, the jigsaw puzzle pieces would not be able to be flexed apart because they are interlocked, nor would it be able to be pulled apart in a sideways direction due to the reinforcing patches which are glued to the top and bottom of the jigsaw pieces. In other word, three dimensional bonding will take place as one practices the present invention.

In the present invention, many different bondline configurations which would act to interlock the pieces together are contemplated, as long as those bondline configurations will act to interlock the two pieces together. This "jigsaw puzzle" effect has proven to be very helpful in joining isotropic and anisotropic materials together. It is important to recognize the geometry in the patch anisotropic material (the plane-woven mat) in order to create a "hand shake" between the two materials which are being bonded together. The reason the woven fabrics are so often selected as the reinforcing patch material is due to their high strength, as opposed to a chopped fiber or swirled mat, and their ease in handling during repair and manufacture. For most automotive vehicle applications, room temperature curing adhesives can be used to produce effective mechanical and chemical bonding at the reinforcing patch/specimen interface. Suitable patch materials and adhesives will be discussed in greater detail hereinbelow.

Consequently, the problems associated with the prior art methods have been overcome by the present invention. The advantages of the present invention include increased flexural integrity for repair parts and superior joint strength in newly manufactured parts.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a side elevational view of an in-plane bondline configuration, according to the present invention, wherein the bondline configuration is a V-shaped complementary mated bondline.

FIG. 2 is a side elevational view of another embodiment of the in-plane bondline configuration of FIG. 1.

FIG. 3 is a side elevational view of an in-plane S-shaped bondline configuration according to the present invention.

DESCRIPTION OF THE PREFERRED EMBODIMENT(S)

Figure 4:
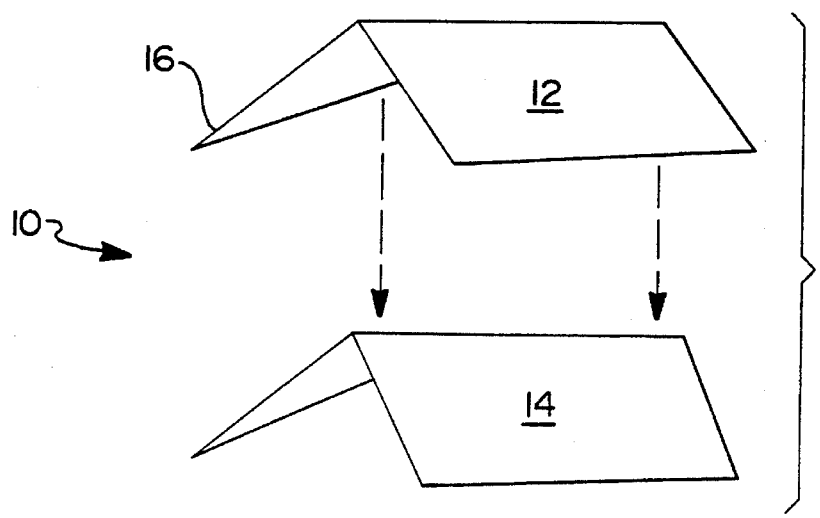
FIG. 4 is an out-of-plane V-shaped bondline configuration according to the present invention.

Referring to FIG. 1, there is shown a side elevational view of a test piece of joined composite materials generally denoted by the numeral 10. Test piece 10 is divided generally into two sections, male piece 12 and female piece 14, bonded together along bondline 16, which, in this case, is the V-shaped in-plane embodiment of the present invention. Likewise, with combined reference to FIGS. 2, 3, and 4, the bondline configuration 16 is a W-shaped in-plane, S-shaped in-plane, and V-shaped out-of-plane configuration, respectively. FIGS. 1 through 4 are merely illustrative of the possible bondline configurations which may be used in accordance with practicing the method of the present invention.

Figure 5:
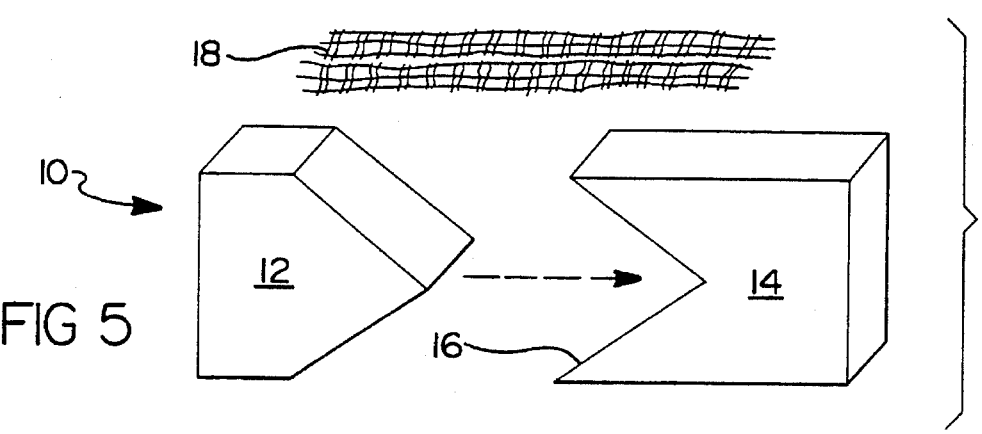
FIG. 5 is an exploded perspective view of the V-shaped in-plane bondline configuration, also illustrating the reinforcing patch material to be placed on top of the V-shaped bondline.

FIG. 5 is an exploded perspective view of the bonding configuration of the V-shaped in-plane bondline configuration, i.e., hereinabove described with respect to FIG. 1. As can be seen from FIG. 5, pieces 12 and 14 are to be bonded together along bondline 16, and thereafter have reinforcement patch 18 applied to the top of the joined pieces. Reinforcing patch 18 will generally, and preferably, cover the entire bondline configuration to further hinder up and down motion between the joined pieces 12 and 14, and to further reduce concentrated stresses along the bondline.

Figure 6:
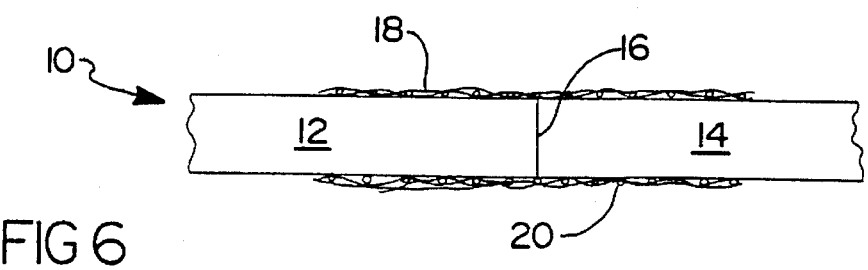
FIG. 6 is a side elevational view of a mated bondline, having two reinforcing patches, one on top of the bonded materials, and one underneath.

FIG. 6 is a side elevational view of pieces 12 and 14 joined along bondline 16, and having two reinforcing pieces, 18 and 20, attached to the top and bottom, respectively, of the test piece 10.

Figure 7:
FIG. 7 is a side elevational view of the resultant repair using prior art methods of scarfing, filling, and double lapping.

FIG. 7 shows a prior art conventional repair where the repair was scarfed, the scarf was filled with resin and filler, and patches were applied to make a double lap joint repair. As can be seen, if stress is applied downwardly from the above the weakest point, rupture is quite likely to happen. The adhesive holding the top patch to the piece will be the strongest thing holding everything together. Furthermore, any up and down motion can loosen the patches, and the resin plug can pop right out of the scarfed area. Thus, three dimensional bonding is substantially absent in the prior art. It should be appreciated that one major disadvantage of scarfing a thin composite is that too much of the good material is removed, thereby ultimately weakening the panel.

The method of the present invention joins a composite material to another material at the bondline. The composite material may be joined to another composite material, or the composite material may be attached to yet another material, such as metal, a different type of composite, plastic, or any other material. The composite material and the other material to which the composite material is being bonded have outer surfaces surrounding the bulk of their respective materials. The method of the present invention also utilizes at least one external patch on at least one of the outer surfaces of the resulting joined materials, whereby the strength of the bond between the two materials is supplemented.

The method of the present invention includes providing a complementary matching and interlocking bondline surface configuration in both the composite material and the other material to which the composite material is to be bonded. This requirement for a bondline configuration is regardless of what the materials being bonded together are, i.e. whether or not both materials are composites, or whether or not they are anisotropic, isotropic, thick or thin, or whether or not they are automotive vehicle panels or any other composites being joined. Their respective interfacing surfaces at the bondline have an increased surface area compared to a common butt joint between the composite material and the other material to which it is being bonded. It is preferred that the bondline be substantially gap-free. Within our method, the two materials are interlocked at their bondline and at least one patch is adhered onto at least one of the outer surfaces of the interlocked combination of materials. Then at least one patch shall extend across the outer surface of the two materials being joined, and preferably covers the bondline of the two materials. An increased strength joining of the composite material to the other material is achieved through this method.

Although described herein are various configurations including U, V, W, and S-shaped bondlines, any interlocking configuration is contemplated by the present invention. In addition to the various in-plane configurations, there are out-of-plane configurations, such as curvatures which are also contemplated by the present invention. For example, as shown in FIG. 4, two out-of-plane V-shaped members could be nested together, like two roofs, one placed on top of the other, glued and reinforced together to effect a good bond. In the case of such an out-of-plane configuration, the reinforcing patch could be placed at either end of the nested "roofs" or along the cracked "roof-lines" as described hereinabove.

One of the key considerations in practicing the present invention is to cut, scroll, stamp out, or otherwise form a nicely matching and interlocking bondline configuration. As described hereinabove, damaged pieces, requiring repair, would have the repair piece placed on top of the damaged area, and a single cut through both pieces of the material (i.e. the repair piece and the original piece), would produce mating and interlocking bondlines in both the repair piece and the original piece.

With reference to FIG. 3, suppose that the area which is designated as number 12 now was damaged. Repair piece 14 may have originally been rectangular in cross-section. However, repair piece 14 could be placed on top of original piece 12, and bondline configuration 16 in an in-plane S-shape could be cut into both pieces 12 and 14 simultaneously in order to achieve a very closely matching and interlocking bondline 16. After the cut, the damaged portion of piece 12 would be discarded, and the newly shaped repair piece 14 would be placed instead. Consequently, glue or another adhesive could be used to adhere repair piece 14 to original piece 12 along bondline 16. As further illustrated in FIG. 6, reinforcement patches 18 and 20 could be placed over the entire bondline, and adhered to the entire surface covering the bondline.

Especially useful is the use of the present bonding method to bond anisotropic to isotropic materials. Previously, anisotropic materials were able to be bonded much more easily to other anisotropic materials, rather than to isotropic materials. Of course, with the present invention, it is still best to match the strengths of the anisotropic materials when bonding them. For example, a plane-woven fiberglass mat is best bonded to another piece of plane-woven fiberglass mat by matching their 0° and 90° orientations to one another. A better bond will take place if the warp and fill threads of the plane-woven mat are matched with other warp and fill threads in the material to which it is bonded. One can see that gluing a square woven piece to the diagonal of another piece of square woven matting would not be as advantageous. Consequently, it is best to create a "handshake between the materials" for materials having 0° and 90° strengths. If possible, aligning the reinforcing patch material with the designated direction of the material to be repaired helps to achieve restoration of the greatest strength.

Woven fabrics are generally selected for the reinforcing patch material because of their ease in handling during repair. Glass fabrics are especially preferred since the composite panels used in many automotive vehicle applications are made of glass fiber-reinforced thermosets. The compatibility of the glass fabric with the fibers of the composite helps to provide an increased bond and consequently overall strength of the repaired composite. Especially useful are plane-woven fiberglass mats, fiber-reinforced resinous sheets, chopped fiber reinforcing patch material, and swirled mat reinforcing patch materials.

The glass reinforcing patch may be applied to only one side of the repair, the tensile loaded side, to maintain the aesthetics of the vehicle panel. As one can imagine, if the front quarter panel of a vehicle is damaged, and the method of the present invention is utilized in order to repair the damaged area, for aesthetic purposes, the glass reinforcing patch may only be applied on the back side of the repaired piece for appearance sake. You see, added strength on the backside is tolerable, although the front side must look like new without any added thickness. Consequently, the front piece can be lightly sanded, and painted to restore its original appearance. One of the advantages of the present invention is that when effecting such a repair, the glass reinforcing patch is best utilized on only the back side of the repaired piece. In this case, the interlocking bondline configuration adds more strength over a one sided scarf and fill repair.

Previously, the standard procedure for repairing glass and epoxy specimens began by abrading or mechanically cleaning the area. Then a combination of resin, plug, and fibers were used to fill in the abraded area as shown in FIG. 7. Thereafter, glass reinforcing patches were applied to either side of the repaired area, thereby effecting a "double lap joint" type repair. The repaired specimen was then placed in a press to squeeze much of the excess epoxy away from the repaired area and to initiate uniform pressure at the patch/specimen interface. Once the specimen was fully cured, it could be removed from the press.

The present invention modifies this standard repair technique by introducing the use of an interlocking matching bondline configuration. These bondline configurations have been developed to create an optimal "isotropic" repair joint design, i.e. a bondline repair without regard to the direction of force. Consequently, repaired composite materials can be subjected to forces which are exerted from many different orientations, without giving way. One way of thinking about this is to see that our invention produces a three-dimensional bond.

Figure 8:
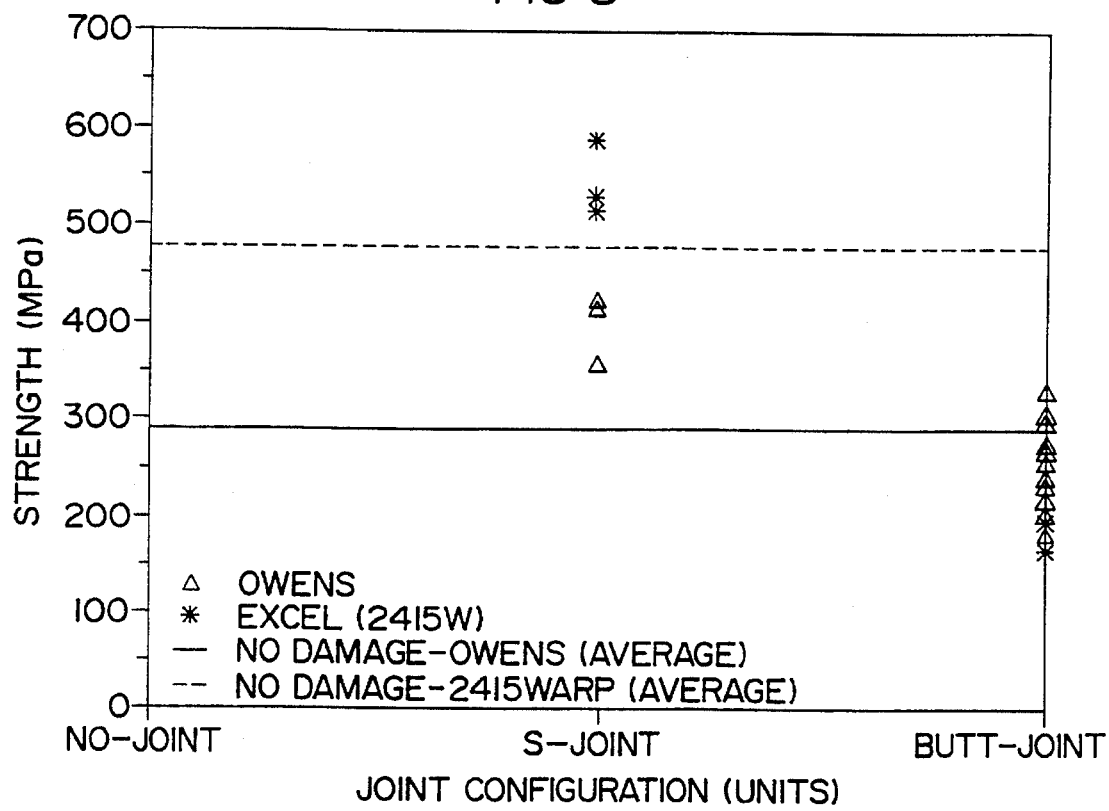
FIG. 8 is a comparative graph showing the strengths of our S-joint bonding compared to the prior art butt joint in a three point bending test. Both materials are an Owens Corning sheet molded compound made of chopped glass fibers in a polyester matrix in a 50% glass/50% matrix by volume combination, the other material is designated as "Excel 2415" from Excel Corp. Excel 2415 is a cross-woven fiberglass material in a vinylester matrix (50% glass by volume).
Figure 9:
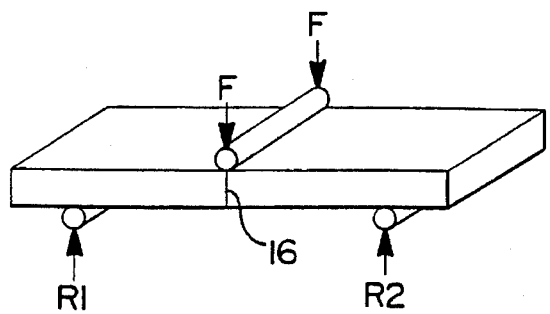
FIG. 9 is a schematic drawing of a three point bending test as used for the testing as graphed in FIG. 8.

During the operation of a three point bending test, as shown in FIG. 9, it can be seen that the strength of the repair also depends upon the strength of the adhesively bonded patches to the repaired specimen. By utilizing the in-plane and out-of-plane bondline configurations of the present invention, unexpectedly high strengths of the repairs were effected, as illustrated by the comparative results graphed in FIG. 8.

In-plane repairs for thin panel composites required an optimal isotropic design for joining two separated composite panels. The S-joint design as illustrated in FIG. 3 appears to optimize the advantageous repair results of the present invention. During the study of in-plane bondline geometries, it was determined that a bondline angle of 90° to the direction of load was the optimum design. As described further hereinbelow, a bondline angle study revealed that the V-joint configuration, which utilized a bondline angle of between about 76° to 86°, exhibited the most superior results.

However, in a study of the depth of joints, the superior strength results encountered appeared to be primarily due to the bondline angle rather than the depth of the joint. However, all of the preliminary bondline analyses supported the fact that if the bondline could be maintained at an angle of 90° to the direction of force, it appeared to be the ideal bondline configuration. Hence, the S-joint as shown in FIG. 3. Note that the design is based on the adjacency of two circles, both being offset on a 45° axis. During the study, it appeared that each circle optimally should have a diameter of ½ of the width of the repair piece in order to restore flexural strength. Note also that the centers of both circles are offset along a 45° line intersecting the parallel outer surfaces of an in-plane plane repair. Utilizing such modified "circles" as the bondline supports the isotropic bondline model which attempts to keep the direction of force always at 90° to the bondline.

A calculation for the diameter of the S-joint circles must be determined before the repair takes place, and the circle diameter is dependent on the size of the area needing repair. For example, a sample calculation for a 2"×2" (50 mm×50 mm) repair zone is as follows. Using the pythagorean theorem, $$a^2+a^2=(2r)^2$$

$$a=(2)^{1/2}r$$

Since the repair zone is 2"×2" (50 mm×50 mm), (r) results in, $$2''=2r+a=2r+(2)^{1/2}r=3.414r$$

$$r=2''/3.414=0.5858''$$

The results of the test after the repair had been effected were compared to the butt joint as shown on the graph of FIG. 8. FIG. 8 shows the strength of the butt joint ranging from about 150–350 MPa, while the S-joint of the present invention shows a strength starting at 350 MPa and rising to 600 MPa, a dramatic improvement.

It has been found through various studies that the butt joint, in other words, a bondline angle of 0°, is the least desirable bondline configuration, as it is the weakest of all the repairs. The results for this series of tests are illustrated in FIG. 8. From the test results, it can be seen that the S-joint is superior in flexural strength to the butt joint by a margin of about 45%. The test was conducted utilizing a butt joint with a double-lap joint of patches. Further tests were conducted in order to determine at what point the S-joint configuration would fatigue. Consequently, cyclical fatigue was applied to both the S-joint and the butt joint at 100, 1,000, 10,000 cyclic intervals. Subsequently, an investigation was embarked upon to evaluate if there was any loss in flexural strength after cycling. The most prevalent observation was that during cycling, if there was any gap along the bondline, the glass patch material tended to locally delaminate a top of the gap.

Furthermore, torsion and tension stress tests were also applied to the S-joint and butt joint. The S-joint revealed superior strength to the butt joint, while tension tests of all of the configurations revealed that the W-joint was superior to the S-joint for tension because the bondline was not allowed to utilize the bondable surface area as efficiently. The results showed that the optimum bondline configuration for tensile loading should be close to 0° to the direction of loading. Since the W-joint maintains this set of criteria, it appeared to be the optimum joint for pure tensile loading. In tests for bonding, it has been shown that the optimum bondline angle for bending should be close to 90° while remaining invariant of the direction of loading. The S-joint is the optimum configuration to satisfy this criteria. Consequently, while the different loads which may be put upon a repaired piece will require different configurations, it can be determined, without undue experimentation, which bondline configuration is best for the particular situation at hand.

Especially useful composite materials include glass fiber-reinforced thermoset plastics and glass fiber-reinforced polyester resins. Our tests were prepared using Owens Corning sheet molded compounds, and Excel 2415 and 8610 composite materials, available respectively from Owens Corning Corporation and Excel Materials from Excel Corporation.

In practicing the present invention, the epoxy adhesive system is preferably a room temperature curing adhesive to produce the desired effective mechanical and chemical bonding at the reinforcing patch/specimen interface. This adhesive will generally also be used for bonding the bondline. For example, an epoxy adhesive system manufactured by Marblot, tradename Maraset 658-Resin, 558-curing agent, was tested as the adhesive for Owens Corning sheet molded compound repairs due to its low viscosity, short room temperature curing cycle, and good strength to failure. Other adhesives which have been found to be effective for adhering Excel materials include resins available from Resin Services Company. In addition, further adhesives which may be used include Dow Derakan A Vinylester and many other low viscosity room temperature curing epoxies.

The above mentioned adhesives can also be used for the addition step of adhering the bondline together prior to applying the at least one reinforcement patch. Moreover, it may be advantageous to sand, or otherwise abrade, the outer surface of the interlocked materials prior to gluing on the reinforcement patch. This creates a better mechanical bonding surface.

Consequently, a new method is being presented for repairing and joining composite materials to other materials in a fashion that results in a stronger, more resilient bond.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for repairing a portion of a fiber-reinforced resin composite material structural member subjected to forces in a plurality of directions, said method comprising the steps of:

identifying a damaged portion of the structural member;

defining a cutting path on the structural member around said damaged portion, wherein said cutting path is non-linear and includes at least one projection or recess;

cutting along said cutting path to remove said damage portion from the structural member and to provide the structural member with a defined periphery;

creating a repair piece of a fiber-reinforced resin composite material;

forming a piece periphery of the repair piece complementary to the defined periphery;

aligning the piece periphery with the defined periphery;

joining the repair piece with the structural member by mechanically interlocking the defined periphery of the structural member and the piece periphery of the repair piece to form a projection and recess type connection;

and adhering at least one fiber-reinforced patch onto an outer surface adjacent the defined and piece peripheries to cover and strengthen the peripheries and form a three dimensional bond.

2. A method as set forth in claim 1 wherein said defined and piece peripheries are selected from the group comprising U-, V-, W-, and S-shaped configurations.

3. A method as set forth in claim 1 wherein said defined and piece peripheries include in-plane and out-of-plane configurations.

4. A method as set forth in claim 1 wherein the repair piece and the structural member to which the repair piece is to be bonded include matched isotropic and isotropic materials.

5. A method as set forth in claim 1 wherein the repair piece and the structural member to which the repair piece is to be bonded include matched anisotropic and isotropic materials.

6. A method as set forth in claim 1 wherein the repair piece and the structural member to which the repair piece is to be bonded include matched anisotropic and anisotropic materials.

7. A method as set forth in claim 1 wherein the repair piece having its greatest strength in 0° and 90° orientations is aligned and bonded to the structural member having 0° and 90° strength orientations in a matching fashion, such that the structural member and the repair piece interlock.

8. A method as set forth in claim 1 wherein said step of adhering at least one patch onto the outer surface is accomplished by utilizing patches which are plane-woven fiberglass mats.

9. A method as set forth in claim 1 wherein said step of adhering is accomplished by utilizing a room temperature curing epoxy resin.

10. A method as set forth in claim 1 including the step of adhering the repair piece to the structural member along the complementary defined and piece peripheries, in addition to adhering at least one patch onto the outer surface adjacent the peripheries.

11. A method as set forth in claim 1 including the step of abrading the outer surface before adhering the at least one patch onto the outer surface.

12. A method as set forth in claim 1 wherein the repair piece includes glass fiber-reinforced thermoset plastic and glass fiber-reinforced polyester resins.

13. A method as set forth in claim 1 wherein said step of adhering at least one patch onto the outer surface is accomplished by utilizing patches made of materials selected from the group comprising plane-woven fiberglass mats, fiber-reinforced resinous sheets, chopped fiber reinforcing patch material, and swirled mat reinforcing patch material.

* * * * *